United States Patent Office 2,934,504
Patented Apr. 26, 1960

2,934,504
ACTIVATION OF CLAY

Gerhardt Talvenheimo, Brookhaven, Pa., assignor to Houdry Process Corporation, Wilmington, Del., a corporation of Delaware No Drawing. Application April 17, 1957
Serial No. 653,295

15 Claims. (Cl. 252—450)

The present invention relates to the activation of clays and is particularly concerned with the preparation therefrom of catalysts of desired physical strength having enhanced activity for cracking and other catalytic conversion of hydrocarbons.

Conventional methods in commercial use for preparing catalysts of desired activity as well as useful decolorizing agents from sub-bentonite clays of the montmorillonite family involve leaching of the clay with aqueous mineral acid at about 200° F. thereby effecting removal of a portion of the alumina content of the clay and simultaneous removal of part of the acid-soluble undesirable components therefrom such as iron and alkali metal compounds. This procedure has also been applied in the attempted activation of clays of the kaolin family, but catalysts having the desired stable activity and other properties required for commercial adoption in existing catalytic cracking processes have not generally been obtained thereby.

It has also been proposed to activate natural mineral products including clays of the kaolin as well as those of the montmorillonite class by incorporating therein acid reacting materials and subjecting the admixture to roasting for effecting reaction between the acid and components of the mineral, followed by washing to remove soluble conversion products thus formed (U.S. Patent 2,582,956 of January 22, 1952).

Methods for activation of clays using liquid sulfuric acid are also known in which the raw clay is mixed with concentrated $H_2SO_4$ followed by aging or denning at elevated temperature to complete the sulfation reaction; the sulfated clay being then mixed with water to effect dissolution of soluble sulfates. It has also been proposed to subject sulfated clays to thermal decomposition at temperatures in excess of 1100° F. followed by treatment with acid solvent to remove alumina and other acid-soluble components leaving a residue composed largely of silica.

In all of the processes hereinbefore described a substantial portion of the original alumina content of the clay is removed. More recently there have been advocated methods for the preparation of contact masses of improved properties, particularly for use as catalysts in cracking and other hydrocarbon conversion processes, wherein the clay, particularly a kaolin clay, is subjected to sulfation so as to incorporate at least 15% $SO_4$ therein and the thus sulfated clay then subjected to treatment at elevated temperatures, advisably in the presence of a reducing agent, to effect decomposition of the metal sulfates therein and driving off the oxides of sulfur in addition to other volatiles that may be present. By these more recent methods, which have now been adopted in the preparation of commercially used catalysts, there are obtained contact masses of desirably high catalytic activity which are exceptionally stable to high temperature steam, and the granules or pellets have shown good resistance to crushing, abrasion and attrition. In such recent methods the original alumina content of the clay remains substantially intact.

The present invention is concerned with further improvements in the properties of the catalytic contact masses obtained by the sulfation-desulfation technique above described, particularly from the standpoint of enhancing yields of desired products and/or reducing the coking characteristics of such clay catalysts when employed in the conversion of hydrocarbons.

In the preferred method for sulfating kaolin clay, the raw clay is mixed with concentrated sulfuric acid and the acid-clay mix, generally without needing further adjustment of liquid content, is extruded to provide pellets of desired size range which are subjected to aging or denning in any one of a number of ways. For instance, the sulfate-containing clay pellets may be denned in the presence of a liquid hydrocarbon, such as a light oil, at 250 to 400° F. or more but below the decomposition temperature of the impregnated sulfuric acid, and maintained in such oil bath for sufficient time to insure complete reaction between the sulfuric acid and the components of the clay. In other embodiments denning is effected in air at about 200-600° F., or with pure steam at temperatures of between 250-350° F., or in air saturated with steam at a wet bulb temperature of from 190-210° F. and a dry bulb temperature of from 250-350° F. Ultimate desulfation of the denned clay is preferably carried out in an environment of steam and hydrogen, and to an extent resulting in a product with less than about 2% $SO_4$ on ignited clay basis.

In accordance with the present invention, the initial treatment of the raw clay is carried out with concentrated sulfuric acid in the presence of an organic hydroxy compound miscible with the sulfuric acid and preferably in the presence of such compound in the form of a polyhydroxy aliphatic compound, the hydroxy compound being free from non-oxo carbonylic groups. The sulfated clay thus obtained is then subjected to denning or aging to complete the sulfation reaction and subsequently treated to decompose the sulfate with evolution of sulfuroxide gases.

Among the preferred hydroxy compounds to be added to the sulfating mix are included simple alcohols, particularly of the polyhydroxy type, such as glycerine and glycols; aldo- and keto-sugars and their glucosides containing a free OH group, and available natural and manufactured products containing such sugars in solution, such as sugar syrups, molasses, and the like. Among other products related to sugars that can be used, but not to equal advantage, are the soluble or solubilized lignins (lignosulfonates). Instead of using the free hydroxy compound as such or the composition containing the same as a component of the sulfating mixture, the hydroxy compound may be previously reacted in whole or part with sulfuric acid or $SO_3$ and employed in the form of such reaction product, with suitable adjustment of sulfuric acid concentration of the clay mix as needed.

The beneficial effects of incorporating the hydroxy compound in the sulfation mix are evidenced with as little as 2% of such compound by weight of the acid (100% $H_2SO_4$ basis) but for full advantages in most instances it is preferred to employ in excess of 5% and up to about 20% of the hydroxy compound. Larger quantities, although not found to be harmful, do not appear to contribute any added benefits.

Th general method employed in preparing the improved contact masses of the invention involves the following sequence of steps:

(1) Mixing the clay with at least 15% by weight concentrated sulfuric acid and with the hydroxy compound to produce an extrudable mix;

(2) Forming tablets, granules or pellets from the mix, preferably by pressure extrusion;

(3) Denning or aging the pellets or granules under conditions avoiding volatilization of the acid or of the hydroxy compound (if a volatile hydroxy compound is employed). When the denning is carried out in a closed system, loss of water and other volatiles during the denning is fully avoided;

(4) Decomposing the sulfate with evolution of sulfur-oxygen gases, preferably in the presence of gaseous reducing agents.

The amount of liquid acid that can be added to the dry clay is a function of the moldability or extrudability of the mixture. In the ordinary case for most kaolin clays the maximum quantity of 93% $H_2SO_4$ that can be added to produce active pellets is that furnishing 60–70% of 100% $H_2SO_4$ by weight of the clay (ignited basis). By first removing combined water from the clay (dehydroxylation), such as by heating the same in the vicinity of 500° C., the acid maximum can be increased to 90–100% of the ignited clay weight.

Another method of increasing the acid to clay ratio giving catalysts of superior properties involves addition of the acid in the form of a gel. It was found that by the addition of concentrated sulfuric acid to a liquid sugar syrup with rapid stirring there was formed a product having the consistency of a gel comparable to gelatin gels. By utilizing such sugar-sulfuric acid gels for admixture with the clay there can easily be obtained an extrudable clay mix containing 100% or more $H_2SO_4$ (100% basis) which mix can be pelleted into an active catalyst having excellent selectivity in hydrocarbon conversion.

EXAMPLE I

Glycerine and sulfuric acid were premixed at room temperature in the proportions of 350 volumes of 86% $H_2SO_4$ to 117 volumes of 95% glycerine. This liquid mixture was mulled with raw Georgia kaolin clay for 15 minutes in the proportions of about 343 ml. of the liquid mixture per kilogram of clay. The obtained paste was extruded and cut to 5 mm. pellets. These proportions are equivalent to about 46% $H_2SO_4$ and about 12% glycerine by weight of clay (ignited basis).

(a) A portion of the above-prepared pellets was denned for 8 hours at 300° F. by passing a hot air stream through the pellets. The pellets were then subjected to treatment in 10% $H_2$—90% steam for 4 hours @ 1350° F. to effect decomposition of the sulfate therein.

(b) Another portion of the pellets produced under (a) above was denned in an autoclave at 300–350° C. for 24 hours to control release of water from the pellets and reduced in 10% $H_2$—90% steam for 4 hours at 1350° F.

Both the air-denned and the steam-denned (autoclaved) pellets had good hardness characteristics and at approximately the same gasoline yield levels, produced in the cracking of a gas oil 29 to 33% less coke than substantially similarly prepared catalyst but without organic hydroxy compound in the acid mix. The steam-denned pellets (Example Ib) showed higher unit activity (total conversion of hydrocarbons) than the air-denned material (Example Ia) but produced more coke and gas at approximately the same gasoline yield level.

EXAMPLE II

Following the procedure of Example Ia above, other batches of catalyst were prepared with higher and lower acid concentrations in the mix and with variations in air-denning time. In some of these 93% sulfuric acid was employed instead of the 86% acid to obtain a more anhydrous sulfating mix. The same general trend to lowered coke make was evident.

EXAMPLE III (a) Following the procedure of Example Ia above, another series of catalysts was prepared from kaolin clay using a premixed sulfating liquid of 93% sulfuric acid and methanol. The results are shown in the attached Table 1. It was found that by increasing the methyl alcohol content of the sulfating mix as to above about 10–12% by weight of the $H_2SO_4$ and decreasing the acid content there was a gradual lowering of the activity of the obtained catalysts.

(b) In order to reduce further the water content of the sulfating mix, another series of kaolin catalysts was prepared using a premixed solution of $SO_3$ and methyl alcohol. There was no appreciable difference observed over the catalysts prepared with the methanol-sulfuric acid mix (Example IIIa). One significant difference observed in this series was that maximum surface area and catalytic activity are developed at about 200° F. air-denning temperature (the higher temperatures bring about appreciable evolution of $SO_3$ fumes) whereas in the methanol-sulfuric acid system this situation does not develop.

(c) Another series of catalysts was prepared using presulfated methanol in the form of methyl sulfate in admixture with 93% $H_2SO_4$. This system of sulfating the kaolin showed no particular advantage over the other systems tried using methanol.

In general, the glycerine addition was found to be more beneficial in improving catalyst properties than the monohydric alcohol.

EXAMPLE IV

To 10 kilograms of raw non-plastic kaolin clay there were added 2 liters of 93% sulfuric acid and 0.96 liter of corn syrup (Karo brand-dark). These materials were blended and added thereto an additional 0.666 liter of 93% sulfuric acid. On an ignited clay basis the mixture contained 15.8% corn syrup (including 25% $H_2O$) and 52.6% $H_2SO_4$ (100%) by weight.

The mix gave good extrusion to form 4.5 mm. pellets. These pellets were denned in air for 8 hours at 300° F., then treated at 1350° F. for 5 hours in 10% hydrogen—90% steam.

EXAMPLE V

To 4.2 liters of 93% sulfuric acid there was added 700 ml. of New Orleans sugar cane molasses. On stirring, the product boiled with foaming, forming a hard dark gel-like reaction product. 2400 ml. of the gel-like polymeric reaction product was mulled with 10 kg. of raw Georgia kaolin clay, then further added 700 ml. of the molasses and 600 ml. of 93% sulfuric acid. After 30 minutes mixing in a Lancaster mixer, the product was extruded as 4.5 mm. pellets which were denned and treated in steam and hydrogen in the same manner as in the preceding example. The mix contained 52.5% $H_2SO_4$ (100%) and 13.5% sugars ($H_2O$ free basis).

The catalyst so obtained, as was also the case of other catalysts prepared by using the sugar-sulfuric acid reaction product gel, differed from the usual sulfated kaolin in a number of ways. The pellets formed by the sugar-sulfuric acid gel technique have a hard, glossy surface and excellent physical stability. After denning, the catalyst pellets have a hard, sharp surface and are stable on water immersion for hours or days. In contrast thereto, the usual sulfated kaolin, in denned or undenned state, disintegrates almost immediately on water immersion.

EXAMPLE VI 1250 ml. of 15% maple—85% cane sugar syrup mixture (Log Cabin brand) was added slowly with stirring to 5250 ml. of 93% sulfuric acid. The mixture set to a dark firm gel.

10 kg. of raw Georgia kaolin clay was mixed with 10.9 kg. of the above gel, mulled for twenty minutes in a Lancaster mixer, and extruded to 4.75 mm. pellets, which were denned and then hydrogen-steam treated under the conditions described in Example IV above. The extrusion mix contained 100.6% $H_2SO_4$ and 14.9% sugars ($H_2O$ free basis) by weight of clay (ignited basis).

EXAMPLE VII

The properties of a number of the catalysts prepared in accordance with the above examples are shown in the attached Table 1. The knife-edge hardness (K.E.) reported in the table was determined by loading a knife edge (of the type used in analytical balances), placed upon the cylindrical surface of the pellet, normal to the longitudinal axis, until the pellet breaks.

The catalyst activity was determined by cracking of an East Texas gas oil of 31.6° API gravity (vacuum assay 468° F. initial—885° F. @ 95%) over the catalyst at 900±5° F., and at a liquid space rate of 1.5 volumes of charge per hour per volume of catalyst. The quantity of 410° F. end point gasoline obtained is determined as volume percent of charge or may be expressed as weight percent charge. Also determined are the quantity of coke produced, the quantity of fixed gas and the specific gravity of the gas. The gasoline to coke ratio at any gasoline yield level is indicative of the coking characteristics of the catalyst.

The runs reported in Table 2 above were made on a heavy gas oil cut of East Texas crude oil from which the top 60% and bottom 15% were removed (API gravity =28.1°, boiling range ° F.=542—95% @ 995) in a fixed catalyst bed reactor at an average bed temperature of about 900° F., at a pressure of 10 pounds per square inch gauge and with the addition of 10% steam to the charge. The space rate of the oil charge was selected to obtain approximately 50 vol. percent conversion of the gas oil and the obtained yields reported on the basis of adjustment to 50% conversion level.

It will be seen from the above table that the improved catalysts of the invention characteristically produce significantly higher gasoline yields at the same conversion Table 1

| Catalyst | OH Compound, Wt. Percent (ignited clay basis) | | $H_2SO_4$, Wt. Percent | Denning, ° F.—hrs. Air | Density, g./cc. | K.E. Hardness gms. | Surface Area, m.$^2$/g. | Cracking Activity | | |
|---|---|---|---|---|---|---|---|---|---|---|
| | | | | | | | | Conv., Wt. Percent | Gaso., Wt. Percent | Gaso./ Coke |
| 1. Ex. Ia | Glycerine | | 11.9 | 46.1 | 300—8 | 0.818 | 4,000 | 60 | 44.0 | 29.0 | 9.7 |
| 3. | ----do---- | | 11.3 | 43.9 | 300—8 | 0.839 | 7,900 | 65 | | | |
| 4. Ex. II | ----do---- | | 13.1 | 56.4 | 300—1 | 0.743 | 5,500 | 96 | 48.7 | 28.0 | 6.9 |
| 5. | ----do---- | | 13.1 | 56.4 | 300—8 | 0.756 | 6,200 | 80 | 47.4 | 28.4 | 6.8 |
| 6. | Methanol | | 3.3 | 63.5 | 300—8 | 0.756 | 7,300 | 83 | 47.2 | 27.8 | 7.2 |
| 7. | ----do---- | | 3.3 | 63.5 | 300—2 | 0.751 | 9,000 | 82 | 48.8 | 27.9 | 6.7 |
| 8. Ex. IIIa | ----do---- | | 6.5 | 55.6 | 300—8 | 0.762 | 7,700 | 75 | 47.1 | 26.1 | 6.3 |
| 9. | ----do---- | | 1.7 | 67.4 | 300—8 | 0.734 | 8,200 | 77 | 48.6 | 29.6 | 7.2 |
| 10. | ----do---- | | 13.0 | 41.7 | 300—8 | 0.843 | 5,100 | 43 | 41.7 | 25.9 | 7.6 |
| 11. | ----do---- | | 13.0 | 41.7 | 300—2 | 0.833 | 5,600 | 43 | 40.6 | 24.8 | 8.1 |
| 14. (SO$_3$) | ----do---- | | 18.4 | 56.0 | 300—8 | 0.819 | 6,100 | 44 | 40.8 | 26.4 | 8.6 |
| 15. | ----do---- | | 18.6 | 57.0 | 300—8 | 0.822 | 5,900 | 40 | | | |
| 18. Ex. IIIc | ex. MeSO$_4$ | | 3.3 | 69.2 | 300—8 | 0.737 | 6,200 | 86 | 48.4 | 27.6 | 6.7 |
| 19. Ex. IV | Corn Syrup | | 15.8 | 52.6 | 300—8 | 0.724 | 5,100 | 56 | 44.4 | 28.6 | 9.0 |
| Pregelled Mixes: | | | | | | | | | | | |
| 20. Ex. V | Molasses | | 16.9 | 52.5 | 300—8 | 0.763 | 5,200 | 65 | 44.0 | 27.6 | 7.6 |
| 21. Ex. VI | Sugar Syrup | | 18.6 | 100.6 | 300—8 | 0.539 | 3,000 | 111 | 50.5 | 29.9 | 6.8 |
| 22. Ex. VII | Lignin | | 12.1 | 74.9 | 300—8 | 0.755 | 5,700 | 79 | 45.9 | 28.2 | 7.5 |

The improved selectivity of the catalysts of the invention will be apparent by comparison with typical kaolin clay catalyst prepared by sulfation-desulfation techniques but without addition of organic hydroxy compound to the sulfating mix. Both catalysts were tested in cracking of East Texas gas oil under conditions above described.

| Yields | Catalyst | |
|---|---|---|
| | Example V | Without OH Compound |
| Gasoline: | | |
| Vol. Percent | 30.4 | 33.0 |
| Wt. Percent | 27.6 | 27.8 |
| Coke, wt. Percent | 3.6 | 4.5 |
| Gas, wt. Percent | 13.1 | 16.4 |
| Gas Gravity (air=1) | 1.14 | 1.26 |
| Conversion, wt. Percent | 44.0 | 48.7 |
| Gasoline/Coke Ratio | 7.6 | 6.2 |

To confirm the improved properties of the catalysts of the invention, certain of these were employed in pilot plant runs under conditions typical of refinery operations. The results are summarized in Table 2 below in comparison with typical kaolin catalyst produced by sulfation-desulfation but without organic hydroxy compound in the sulfating mix.

Table 2

| Catalyst | Typical Kaolin | #3 | #15 | #21 |
|---|---|---|---|---|
| OH Compound in Mix | None | Glycerine | Methanol | Sugar Syrup |
| Conversion, vol. Percent | 50 | 50 | 50 | 50 |
| C$_5$+ Gasoline (385° F. @ 90%) vol. Percent | 37.0 | 38.4 | 38.2 | 38.6 |
| C$_4$ Cut, vol. Percent | 12.9 | 12.1 | 12.1 | 11.4 |
| Dry Gas, wt. Percent | 6.0 | 5.5 | 5.5 | 5.7 |
| Coke (inc. 7% H$_2$) wt. Percent | 3.6 | 3.2 | 3.2 | 2.7 |
| Octanes F$_1$ Clear | 92.8 | 93.0 | 93.0 | 92.6 | levels than the typical catalyst compared, and show better gasoline/coke and gasoline/gas ratios.

Examples of other organic hydroxy compounds that can be used in the practice of the invention include, in addition to the heretofore described syrups, sugars and alcohols and their sulfated or sulfonated derivatives; propylene glycol, ethylene glycol, polyglycols, sorbitol, pentaerythritol, etc. The hydroxy compound employed must be dispersible or soluble in water or acid in the liquid concentrations used, so that the liquid compositions obtained can be mixed with the clay to form a coherent mass of moldable or extrudable consistency, preferably without further subsequent adjustment of the water content of the mix.

Obviously many modifications and variations of the present invention as hereinbefore set forth may be made without departing from the spirit and scope thereof and therefore only such limitations should be imposed as are indicated in the appended claims.

What is claimed is:

1. In the preparation of active catalysts from clay by methods involving sulfation of such clay to incorporate sulfate therein by reaction with components of said clay and followed by decomposition of the thus combined sulfate at elevated temperature with evolution of sulfur-oxide gas, the improvement which comprises effecting such sulfation by treatment of the clay with a composition comprising concentrated sulfuric acid and a saturated organic hydroxy compound miscible with said acid and present in an amount of at least 2% by weight of acid, said compound containing an alcoholic hydroxy group and being free of non-oxo carbonylic groups.

2. The method according to claim 1 wherein said hydroxy compound is an alcohol.

3. The method according to claim 1 wherein said hydroxy compound is a polyhydric alcohol.

4. The method according to claim 1 wherein said hydroxy compound is a sugar.

5. The method according to claim 3 wherein said polyhydric alcohol is glycerine.

6. The method according to claim 4 wherein said sugar is present in the form of a gel-like product obtained by mixing a sugar solution with concentrated sulfuric acid.

7. The method of activating kaolin clay which comprises effecting interaction of the clay with a reaction mixture of concentrated sulfuric acid and a saturated organic hydroxy compound miscible with the sulfuric acid to obtain a sulfated clay, said compound being free of non-oxo carbonylic groups and containing an alcoholic hydroxy group, and thereafter treating said sulfated clay with steam at elevated temperature to effect decomposition of the combined sulfate in the clay with the evolution of sulfur-oxide gas.

8. The method of forming active catalysts from kaolin clays which comprises admixing in optional order concentrated sulfuric acid, kaolin clay and a saturated organic compound containing an alcoholic hydroxy group but being free of non-oxo carbonylic groups, in proportions to form an extrudable mix, forming such mix into pieces of desired size and shape, aging such pieces to further sulfation of the clay, and decomposing the sulfate with evolution of sulfur-oxygen gas by heating said clay under reducing conditions.

9. The method of preparing active catalyst from kaolin clay which comprises admixing concentrated sulfuric acid with a liquid sugar syrup to form a gel-like product, mulling such gel-like product with kaolin clay to form a mass of extrudable consistency, forming such mass into regularly shaped pieces of granular catalyst size, and decomposing the sulfate in such pieces by subjecting the same to a reducing atmosphere at elevated temperature in the presence of steam.

10. The method of preparing active catalyst pellets from kaolin clay which comprises mixing the clay with at least 15% by weight concentrated sulfuric acid and with an organic polyhydroxy alcohol in an amount furnishing at least 2% by weight of the sulfuric acid (100% $H_2SO_4$ basis) to provide an extrudable mix, forming such mix into pellets by extrusion under pressure, denning the extruded pellets under conditions avoiding volatilization of components, and decomposing sulfate in the pellets by treatment in a stream of hydrogen and steam at elevated temperature.

11. In the sulfation of clay with concentrated sulfuric acid, the improved method of increasing the maximum amount of acid that can be added to the clay to obtain an extrudable mix, which method comprises adding the sulfuric acid to the clay in the form of a gel-like product obtained by admixing the concentrated sulfuric acid with a sugar syrup.

12. The method of preparing a sulfated clay mix of high sulfuric acid to clay ratio which comprises admixing concentrated sulfuric acid with a sugar syrup with stirring to form a gel-like product and mixing such product with the clay in proportions furnishing in excess of 70% $H_2SO_4$ by weight of the clay on ignited clay basis.

13. An extrudable clay-sulfuric acid mix containing in excess of 70% $H_2SO_4$ by weight, said mix comprising the premixed gel-like reaction product of the sulfuric acid and a sugar syrup.

14. The method of sulfating clay which comprises admixing concentrated sulfuric acid and a polyhydroxy organic compound containing alcoholic hydroxy groups and being free of non-oxo carbonylic groups, mulling the mixture with kaolin clay to form a stiff paste, forming the paste into granular pieces, and denning said pieces at elevated temperature.

15. The method which comprises premixing concentrated sulfuric acid with 2% to about 12% methanol and utilizing the obtained mixture in sulfation of a kaolin clay in proportions furnishing at least 15% $H_2SO_4$ by weight of the clay (dry basis).

References Cited in the file of this patent

UNITED STATES PATENTS

| | | |
|---|---|---|
| 1,492,184 | Weir | Apr. 29, 1924 |
| 1,781,265 | Baylis | Nov. 11, 1930 |
| 1,792,625 | Baylis | Feb. 17, 1931 |
| 2,192,000 | Wilson | Feb. 27, 1948 |

FOREIGN PATENTS

| | | |
|---|---|---|
| 696,943 | Great Britain | Sept. 9, 1953 |